United States Patent
Edmonds et al.

(10) Patent No.: US 12,301,622 B1
(45) Date of Patent: May 13, 2025

(54) SYSTEM FOR CYBERSECURITY CAMPAIGN ARTIFACT DISCOVERY AND TASKING

(71) Applicant: Morgan Stanley Services Group Inc., New York, NY (US)

(72) Inventors: Joseph Edmonds, Ellicott City, MD (US); Russell Moriarty, Ellicott City, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/829,109

(22) Filed: Sep. 9, 2024

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
CPC .......................... H04L 63/1483; H04L 63/1416
USPC .......................................................... 726/22
See application file for complete search history.

(56) References Cited

U.S. PATENT DOCUMENTS

| | | | |
|---|---|---|---|
| 9,516,053 B1* | 12/2016 | Muddu | G06F 16/9024 |
| 9,635,049 B1 | 4/2017 | Oprea et al. | |
| 10,291,645 B1* | 5/2019 | Frantzen | G06F 21/554 |
| 11,240,275 B1 | 2/2022 | Vashisht et al. | |
| 11,397,808 B1 | 7/2022 | Prabhu et al. | |
| 2004/0034663 A1 | 2/2004 | Noguchi | |
| 2014/0201836 A1 | 7/2014 | Amsler | |
| 2017/0134423 A1 | 5/2017 | Sysman et al. | |
| 2018/0324207 A1* | 11/2018 | Reybok, Jr. | H04L 63/1441 |
| 2019/0207966 A1 | 7/2019 | Vashisht et al. | |
| 2019/0207967 A1 | 7/2019 | Vashisht et al. | |
| 2020/0204572 A1 | 6/2020 | Jeyakumar et al. | |
| 2020/0327223 A1* | 10/2020 | Sanchez | G06F 21/554 |
| 2020/0344251 A1* | 10/2020 | Jeyakumar | H04L 51/212 |
| 2020/0389486 A1 | 12/2020 | Jeyakumar et al. | |
| 2020/0396258 A1 | 12/2020 | Jeyakumar et al. | |
| 2021/0173937 A1* | 6/2021 | Vargas | G06F 21/552 |
| 2021/0288990 A1* | 9/2021 | Kao | H04L 63/1433 |
| 2021/0344651 A1* | 11/2021 | Joshi | H04L 12/4641 |
| 2022/0101326 A1 | 3/2022 | Kim et al. | |
| 2022/0141188 A1* | 5/2022 | Apger | H04L 63/0263 726/22 |

(Continued)

*Primary Examiner* — Badri Narayanan Champakesan
(74) *Attorney, Agent, or Firm* — Weitzman Law Offices, LLC

(57) ABSTRACT

A system and method for detecting cyberattacks involves monitoring and analyzing incoming email received over the internet using enterprise telemetry; extracting observations from an enterprise telemetry data feeds and transmitting to a summarization module for summarizing a potential indicator of compromise pertaining to the email monitored and analyzed by the network telemetry; storing the observation summarization data in a graph database; querying over the internet an external cybersecurity threat intelligence provider, upon identification of a true-positive network threat, for enriching information and artifacts contained within the true-positive network threat, receiving over the internet enriching information and artifacts from the external cybersecurity threat intelligence provider, and storing the received enriching information and artifacts in the graph database; and identifying a new indicator of compromise using data stored in the graph database.

13 Claims, 5 Drawing Sheets

(56) References Cited

U.S. PATENT DOCUMENTS

2023/0283629 A1* 9/2023 Boyer ................ H04L 63/1416
 726/22
2023/0412626 A1* 12/2023 Wright .................... H04L 41/16

* cited by examiner

SYSTEM FOR CYBERSECURITY CAMPAIGN ARTIFACT DISCOVERY AND TASKING

FIELD

This disclosure relates to computer systems and, more particularly, to cybersecurity systems and methods.

BACKGROUND

The threat of cyberattacks is a growing concern for enterprises of all sizes and sectors, especially financial institutions. One of the most significant challenges that enterprises face is detecting and responding to cybersecurity threats, including data breaches and system compromises, before they cause damage or significant damage. Indicators of compromise are critical instruments that help enterprises identify and mitigate potential threats by providing early warning signs of malicious activity.

An indicator of compromise ("IoC") is an artifact that can be observed in a computer network, on a computer endpoint such as within a file or memory, or within another source of enterprise logging/telemetry that indicates with some degree of confidence, the presence of a cybersecurity threat. IoCs can include (but are not limited to) IP addresses, domain names, file hashes, file names, registry keys, and URLs.

A campaign artifact is an identifiable element, derivative element, or calculation which ties an observable to a particular set of malicious activities or infrastructure. Artifacts are sometimes unique information found in reference lookups against an observable, such as domain registration information for a domain IoC. Other artifacts are derivative calculations or are functionally applied to sets of reference information against the observable.

A threat intelligence feed is a stream to an enterprise from an external source about potential cyberattacks (known as "threat intelligence"). Threat intelligence feeds use machine language algorithms to predict the likelihood that infrastructure will be associated with phishing, malware or spam. Threat intelligence feeds may also identify if a domain name or IP address is risky, who owns the domain name or IP address, and what other cyber-assets are associated with the domain name or IP address. Enterprises are known to use external intelligence feeds as their sole source of cybersecurity against cyberattacks.

Business email compromise ("BEC") is a type of cyberattack where the cyberattacker uses email to trick someone into sending money or divulging confidential company information, and does not typically involve spam, malware or corrupted files. The cyberattacker typically poses as a trusted figure, then asks for a fake bill to be paid or for sensitive data they can use in another attack or scam. BEC attacks are on the rise due to increased remote work. In a BEC cyberattack, the BEC cyberattackers typically register one domain to target one enterprise, and only that specific target enterprise receives emails from that domain. In that regard, BEC cyberattacks are not widely and indiscriminately directed, but rather are directed at a single specific target. Thus, external threat intelligence feeds are unlikely to provide beforehand knowledge of IoCs identifying a BEC cyberattack.

SUMMARY

This disclosure describes solutions that provide significant advances in addressing the aforementioned problems. Implementations employing the teachings herein enable the detection of cyberattacks which could solely target a given enterprise, such as BEC cyberattacks.

One aspect of this disclosure involves a system for detecting cyberattacks, such as spear phishing and BEC attacks, transmitted over the internet. The system includes enterprise telemetry for monitoring and analyzing incoming email received over the Internet, a summarization module for summarizing a potential indicator of compromise pertaining to the email monitored and analyzed by the network telemetry, a campaign database comprising a graph database and a key-value database for storing data from the enterprise telemetry and from an external intelligence threat feed, a campaign engine, one or more processors, and non-transitory memory. The non-transitory memory stores instructions that, when executed by the one or more processors, cause the one or more processors to extract observations from the enterprise telemetry data feeds and transmit to summarization module for summarizing, store the observation summarization data in the graph database, query over the Internet an external cybersecurity threat intelligence provider, upon identification of a true-positive network threat, for enriching information and artifacts contained within the true-positive network threat, receive over the internet enriching information and artifacts from the external cybersecurity threat intelligence provider, and store the received enriching information and artifacts in the graph database, and identify a new indicator of compromise using data stored in the graph database.

Another aspect of this disclosure involves a computer-implemented method for detecting cyberattacks, such as spear phishing and BEC attacks, transmitted over the Internet. The method includes the actions of monitoring and analyzing incoming email received over the internet using enterprise telemetry, extracting observations from an enterprise telemetry data feeds and transmitting to a summarization module for summarizing a potential indicator of compromise pertaining to the email monitored and analyzed by the network telemetry, storing the observation summarization data in a graph database, querying over the Internet an external cybersecurity threat intelligence provider, upon identification of a true-positive network threat, for enriching information and artifacts contained within the true-positive network threat, receiving over the Internet enriching information and artifacts from the external cybersecurity threat intelligence provider, and storing the received enriching information and artifacts in the graph database, and identifying a new indicator of compromise using data stored in the graph database.

BRIEF DESCRIPTION OF THE DRAWINGS

This disclosure is further described in the detailed description that follows, with reference to the drawings, wherein the same reference numbers appearing in the various drawings and description designate corresponding or like elements among the different views, and in which.

Other aspects, features and advantages will become more fully apparent from the following detailed description, the appended claims, and the accompanying drawings (which are provided solely for purposes of illustration without restricting the scope of any embodiment), of which:

DETAILED DESCRIPTION

Figure 1:
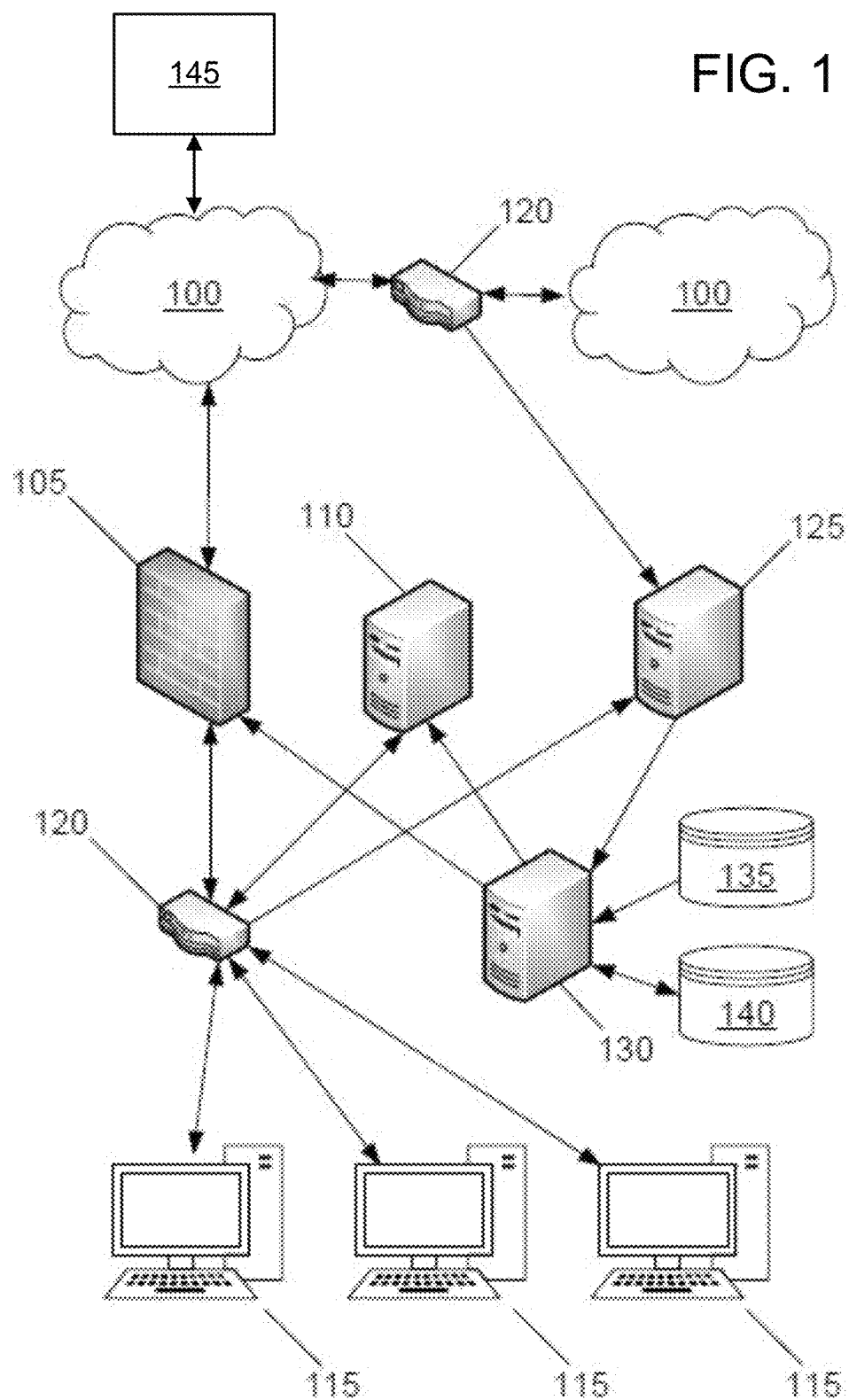
FIG. 1 illustrates, in simplified form, one representative example of a system of computing devices implementing the teachings herein, which are used to examine artifacts transmitted over a network, generate derived artifacts such as hashes of web domains, and act to prevent potentially malicious artifacts from being received or executed by other computing devices communicatively coupled to the network.

BEC cyberattacks are typically committed by advanced persistent threat actors who continually change their tactics, techniques and procedures ("TTPs") as well as infrastructure (e.g., domains, email addresses, hosting, etc.).

As used herein, a cyber campaign refers to a series of coordinated cyber operations, which take place over time, to achieve a cumulative outcome leading to strategic advantage. Traditional threat intelligence approaches gather observables from sources which do not have visibility on that organization's enterprise-specific telemetry. Pairing external reference information with that organization's enterprise-specific data enables a Campaign Analysis Engine to leverage details and information not otherwise available to threat analysts when searching for targeted threats.

The Campaign Analysis Engine keeps track and detects IoCs and artifacts in an automated way and at scale. The Campaign Analysis Engine is a computer-implemented method for monitoring and discovering new IoCs based on enterprise-sourced telemetry, externally sourced threat intelligence feeds, and analysis/tasking workflow in an IoC detection engine. The IoC detection engine receives telemetry from across the enterprise and compares logs with a maintained list of IoCs, alerting an analyst when there is a match so that the IoC can be triaged. Artifacts are used to discover new IoCs, establish linkages between pairs of related IoCs, and in cluster analysis to associate groups of IoCs with specific threat actors or campaigns.

Identification of true positive network threats triggers on-demand external threat intelligence and reference sources to be queried for enriching information and artifacts contained within the true positive network threats. Original identification of true positive threats may be via file-based or network-based analytics, spam monitoring, custom analytics, etc. Artifacts may include, but are not limited to, email addresses, physical addresses, contact names, organization names, transport layer security ("TLS") hashes, ISP information, and domain registrar information. Artifacts may also include derived data such as hashes of enriching information, fuzzy hashing, locality-sensitive hashing, etc.

Automated follow-on queries to external cybersecurity threat intelligence providers are used to enrich the enterprise-sourced data with externally sourced threat intelligence data. A caching layer is used to store both the enterprise-sourced data and the externally sourced threat intelligence data. The caching layer is used to store observables, associated artifacts obtained via external lookups, observation summarization data, and derived artifacts such as hashes of other artifacts. New IoCs are identified via methods such as similarity scoring, hashing, etc. conducted on data within the caching layer. New IoCs are also identified by using external threat intelligence providers to pivot on artifacts associated with malicious actors or campaigns. Utilizing external threat intelligence feeds and reference sources in this way allows for discovery of new IoCs even if those IoCs have not yet been observed in the enterprise telemetry. These discovered IoCs are automatically tasked in an on-premises IoC monitoring system so that if they later appear in enterprise data, an alert will be generated.

Users are alerted as new IoCs are discovered and tasked, allowing them to override the tasking and/or label the artifact as a known false-positive. The system also makes recommendations to users regarding potential new artifacts that may be associated with ongoing threat actor campaigns that may have been partially observed in enterprise telemetry. These recommendations may be based on similarity scoring or machine learning methods such as Bayesian classifiers, cluster analysis, etc.

More particularly, the Campaign Analysis Engine is a computer-implemented method for monitoring and discovering new IoCs based on (1) enterprise-sourced telemetry, (2) externally sourced threat intelligence, and (3) analysis/tasking workflow in an IoC detection engine. The Campaign Analysis Engine can be regularly used to detect tailored spear phishing and BEC cyberattacks. As a detection service, it provides enumeration capabilities against threat actors to identify new and historical attacks and is particularly well suited for email security applications.

FIG. 1 illustrates, in simplified form, one representative example of a system of computing devices implementing the teachings herein, which are used to examine artifacts transmitted over a network, generate derived artifacts, and act to prevent potentially malicious artifacts from being received or executed by other computing devices communicatively coupled to the network.

A network of computing devices may be operated by an organization such that they have some intercommunication with the Internet 100 or a similar external network through which malware tends to be transmitted freely. Firewall 105 may act as a defense against some malware by having blacklists set up for particular web domains or IP addresses. A mail server 110 for the organization's domain may further act as a defense against some malware by rejecting email messages based on source domain, attachments, or other indicia of malice, and prevent the email clients of a number of client computing devices 115 from opening malicious emails. Ultimately, however, existing blacklists or heuristics may prove ineffective in fully defending an organization against cyberattacks, particularly against a BEC attack.

A number of network taps 120 may be operated externally or internally (that is, outside the firewall 105 or inside the firewall 105) in order to identify packets, files, emails, or other artifacts and catalogue information about them, including their source web domain. The network taps 120 may forward copies of such artifacts to an analysis subsystem 125. The analysis subsystem 125 may perform either static or sandboxed dynamic analysis, as well as file analysis (e.g., finding a PDF with metadata including an email address identifying the account used to edit the PDF), PCAP/network protocol analysis (i.e., header fields in SMTP events, extraction of deeply embedded observables such as email thread history, etc.) and extraction of observables from enterprise logs (e.g., proxies, endpoints, etc.), in order to obtain a determination of the danger presented by the artifact being received by or executed by one of the client computing devices 115.

A domain hashing and correlation sub-system 130 will utilize information from a WHOIS sever or other data cache 135 to generate a domain correlation hash ("DCH") or domain correlation hash-of-hashes ("DCHH"), a fingerprint of the domain. These DCHs or DCHHs can further be used to identify a correlation between two web domains and these correlations may be used further to identify, automatically and at scale, a large number of potentially malicious web domains and store them in one or more databases 140 or other data stores.

Cybersecurity threat intelligence providers 145 are external to the organization and provide threat intelligence feeds to the organization via the Internet 100. More specifically, the organization can request threat intelligence from the cybersecurity threat intelligence provider 145, such as DomainToolsR, via the Internet 100, and the cybersecurity threat intelligence provider 145 can transmit a threat intelligence feed to the organization via the Internet 100. External threat intelligence providers may provide Whois and other DNS profile data for threat intelligence enrichment. For example, upon identifying a compromised email address, the organization can obtain from the threat intelligence provider 145 all domains registered by the person who registered the compromised email address and/or was registered with the same physical address as the person who registered the compromised email address.

Figure 2:
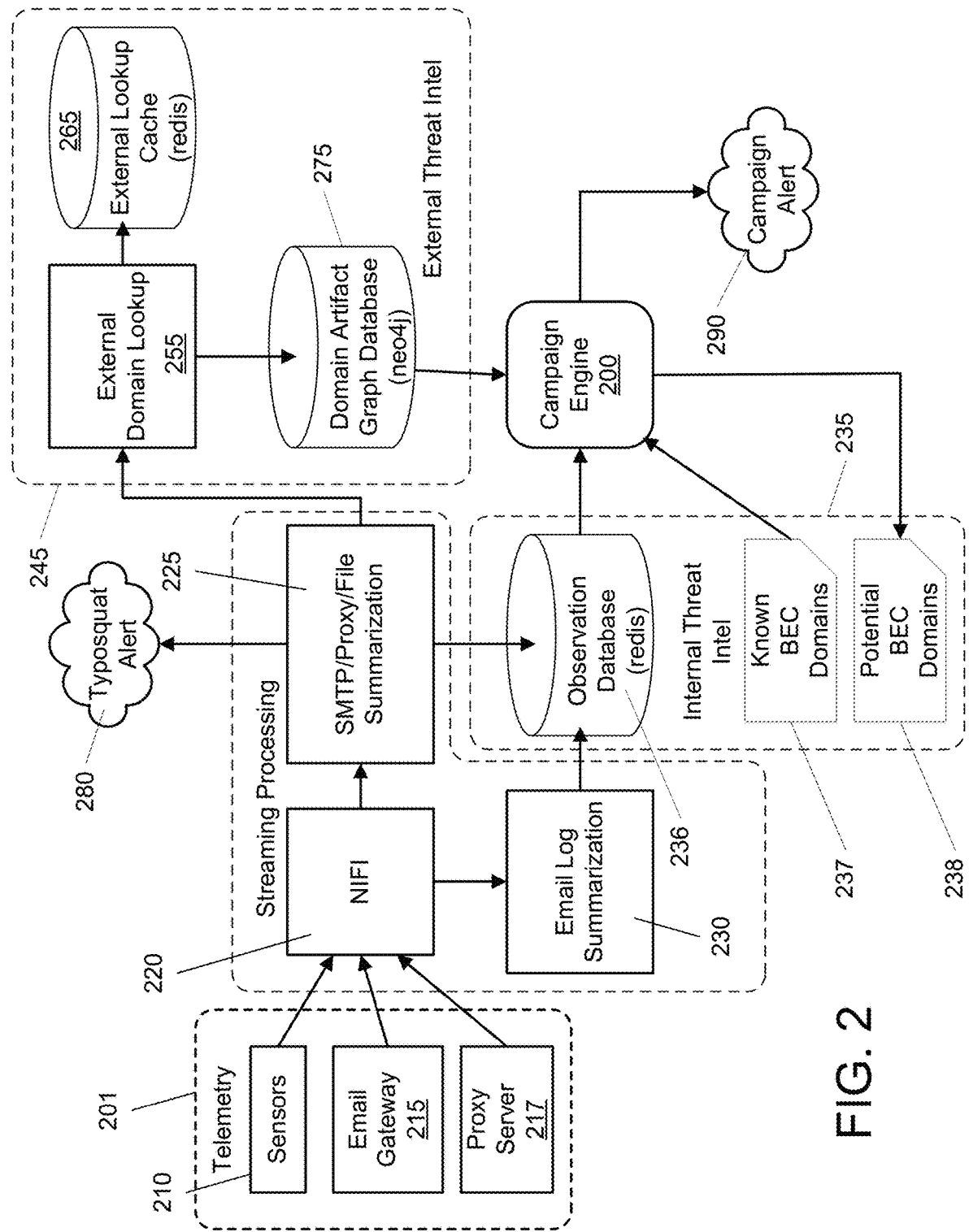
FIG. 2 illustrates, in simplified form, one example of a system of computing devices implementing the teachings herein to detect typosquat domains impersonating enterprise contacts, such typically seen in BEC cyberattacks, in real time and at scale and to track malicious actor campaigns using internal and external threat intelligence.

Typosquatting is when a cyberattacker registers a common misspelling of another organization's domain as their own. FIG. 2 illustrates, in simplified form, one example of a system of computing devices implementing the teachings herein that is used to detect typosquat domains impersonating enterprise contacts, such typically seen in BEC cyberattacks, in real time and at scale, and to track malicious actor campaigns using internal and external threat intelligence. The campaign analysis engine 200 is part of a larger detection flow. The computer-implemented method for monitoring and discovering new IoCs is based on enterprise-sourced telemetry 201, externally sourced threat intelligence 245, and analysis/tasking workflow in the campaign analysis engine 200, which can preferably be a CAE alert generation component.

Network sensors 120 flow data to one or more SMTP sensors 210 monitor the organization's email server using Simple Mail Transfer Protocol ("SMTP"). An email gateway 215 analyzes incoming email messages for threats to determine whether to block or allow each email message and emits email logs. A proxy server 217 provides a gateway between enterprise users and the Internet 100, and emits proxy logs of user activity and/or connection data. The outputs of SMTP sensor 210, email gateway 215 and proxy server 217 are transmitted to NiFi 220 which is a platform for processing and distributing data between different systems. Cloud and on-premise enterprise infrastructure logs and data may be further included in this data flow. The NiFi 220 platform distributes data to a SMTP/Proxy/File Summarization module 225 and an Email Log Summarization module 230.

The SMTP/Proxy/File Summarization module 225 and the Email Log Summarization module 230 sends data to the Internal Threat Intelligence module 235. Data regarding observed IoCs and artifacts is stored in the Observation Database 236, which is preferably a Redis database, and data regarding known BEC domains is stored in the Known BEC Domains database 237. In turn, that data regarding observed IoCs, artifacts and known BEC domains is sent to and used by the campaign engine 200 to generate and task new IoCs, and to generate campaign alerts 290 when new artifacts observed in enterprise telemetry are determined to share similarity with known BEC domains. The campaign engine 200 sends data about potential BEC domains and artifacts to the Internal Threat Intelligence module 235 and is stored in the Potential BEC Domains database 238.

The SMTP/Proxy/File Summarization module 225 will issue a typosquat alert 280 if it identifies a malicious domain registered by a typosquatter. The SMTP/Proxy/File Summarization module 225 also sends data and requests for information to an enterprise-sourced external threat intelligence module 245. Such external threat intelligence module 245 have an external domain lookup component 255 for interacting with external threat intelligence providers 145 via the Internet 100 for requesting and obtaining Whois and other DNS profile data, an external lookup cache 265 for storing domain artifacts returned from external threat intelligence providers 145, and a graph database 275 for storing domain artifacts. A graph database is a database that uses graph structures for semantic queries with nodes, edges, and properties to represent and store data. Graph database 275 may be a Neo4j database, and the external lookup cache 265 may be a Redis database. The enterprise-sourced external threat intelligence module 245 provides threat intelligence feeds to the campaign engine 200.

Figure 3:
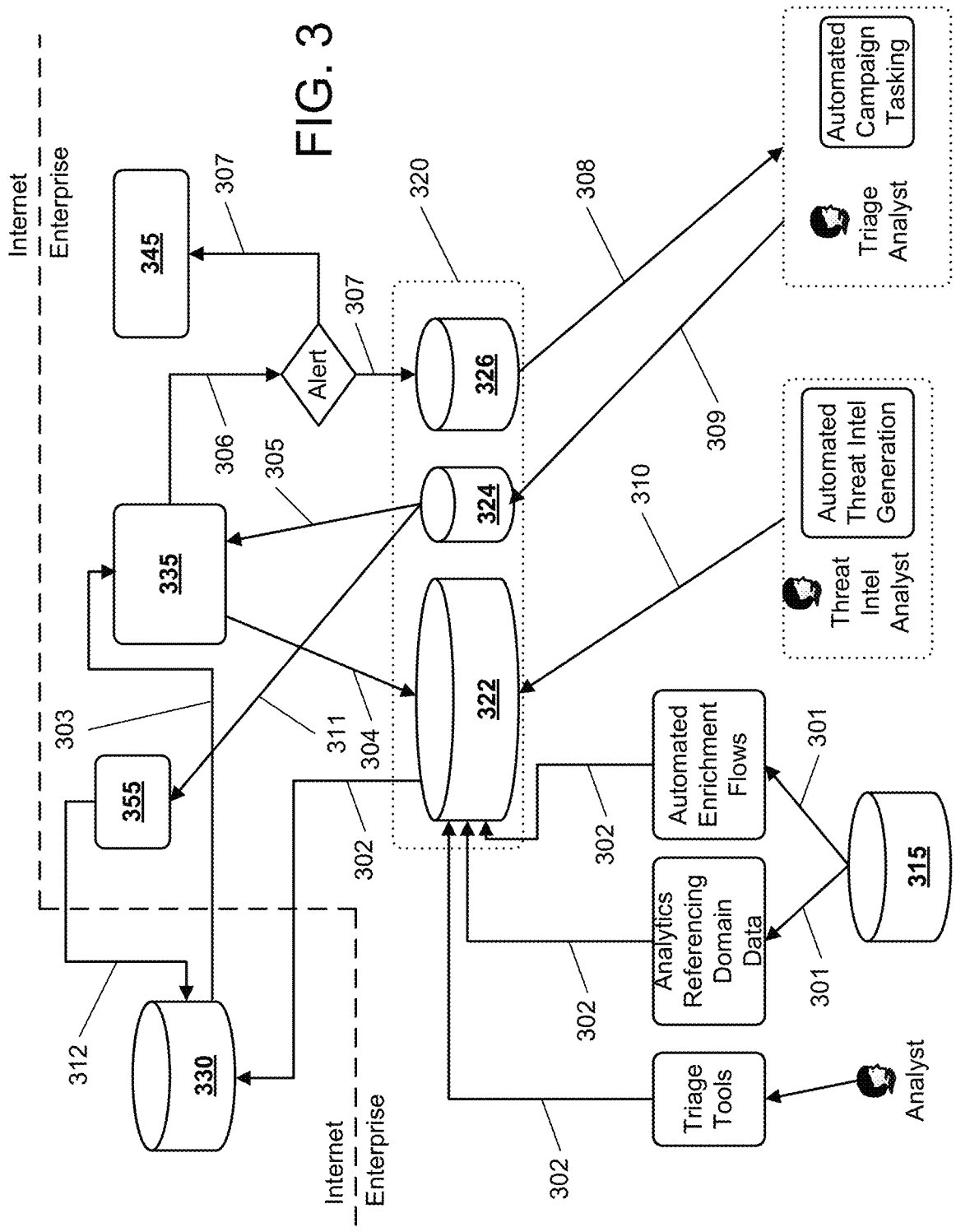
FIG. 3 illustrates, in simplified form, one example of a flow diagram including system architecture, illustrating how normal system activity drives automated campaign analysis alerting and subsequent second order tasking in accordance with the teachings herein.

FIG. 3 illustrates, in simplified form, one example of a flow diagram including system architecture, illustrating how normal system activity drives automated campaign analysis alerting and subsequent second order tasking in accordance with the teachings herein. More particularly, FIG. 3 graphically depicts the operation of the system depicted in FIG. 2.

The organization uses its own enterprise network telemetry 315 as a data feed to the campaign database 320 which is also referred to as a caching layer. The caching layer is used to store observables, associated artifacts obtained via external lookups, and observation summarization data such as that from SMTP/Proxy/File Summarization module 225 and Email Log Summarization module 230. The data stored in the caching layer is used in automated processes as well as in human-driven discovery operations. In a preferred embodiment, the caching layer is implemented using a combination of key-value and graph databases. As depicted in FIG. 3, the campaign database 320 comprises a graph database 322 for storing observables and associated artifacts, a key-value database 324 for storing tasked artifacts, and a database 326 for storing potential new taskable artifacts. In a further preferred embodiment, graph database 322 may be a neo4j database and key-value database 324 may be a Redis database.

A persistent data store, such as campaign database 320, maintains confirmed network threats previously detected within the enterprise environment. Original identification of true positive threats may have been made via file-based or network-based analytics, spam monitoring, custom analytics, etc. Artifacts may include, but are not limited to, email addresses, physical addresses, contact names, organization names, transport layer security ("TLS") hashes, ISP information, and domain registrar information. Artifacts may also include derived data such as hashes of enriching information, fuzzy hashing, locality-sensitive hashing, etc.

New data is ingested into the caching layer (campaign database 320) in a 3-stage process. First, in step 301, observations are extracted from enterprise data feeds. Examples of observations include domains, email addresses, IP addresses, hostnames, binary signatures, etc. Observations that are observed for the first time undergo additional processing (e.g., for typosquat detection). These observations can include endpoint logs, network sensor captures, file analysis data, or logs from third party services running within the enterprise environment.

Observations may be extracted via stream or batch processing. Summarization data for observations, such as the data from SMTP/Proxy/File Summarization module 225 and Email Log Summarization module 230, may include first-seen/last-seen timestamps, observation count by log source, and observation context (e.g., outgoing email, incoming email, blocked email, etc.). For example, when the organization's own network telemetry 315, such as SMTP sensors 210 and Email Gateway 215, observe a domain for the first time, contextual information about the newly observed domain is recorded and summarized and such as the date/time of the observation, whether the domain was an incoming email, on the cc line of an incoming email or an outgoing email from the organization, and if it is an incoming email, whether it was blocked by existing email controls or was it delivered internally within the organization is also recorded. At step 302, these summarized observations are transmitted to, and stored in the graph database 322, and then compared with the IoCs and artifacts already stored in the graph database 322 and the key-value database 324, and if observed for the first time, additional processing occurs to determine if the new observation may be a typosquat of an established contact or if it may be related to a known BEC actor/campaign.

In the second stage, if at step 302, there are no artifacts in the external lookup cache 265 relevant to the enterprise-sourced observation, then external domain data sources 330, such as external cybersecurity threat intelligence providers 145 and/or public reference sources are queried for additional information/context about the new observation. For example, after observing a domain for the first time, the system will obtain all available information from external cybersecurity threat intelligence providers 145, including artifacts such as Whois and other DNS profile data. IoCs are usually observed directly, and artifacts are not observed directly. For example, a phone number included with a domain's registration information is an artifact.

In the third stage, the enriching information is received and analyzed by the organization, and then ingested into the caching layer (campaign database 320). More specifically, at step 303, the new artifacts in the external intelligence feed from external cybersecurity threat intelligence providers 145 are received by the enterprise-based Campaign Analysis module 335. At step 304, the artifacts in the external intelligence feed from the external cybersecurity threat intelligence providers 145 are modelled and stored in the graph database 322. At step 305, the artifacts in the external intelligence feed from external cybersecurity threat intelligence providers 145 are compared against the tasked artifacts stored in the key-value database 324. At step 306, an alert is issued if any of the artifacts in the external intelligence feed from the external cybersecurity threat intelligence providers 145 for the newly observed domain correlate with any of the previously tasked artifacts stored in the key-value database 324. The system also makes recommendations to users of potential new artifacts that may be associated with ongoing threat actor campaigns that have been partially observed in enterprise telemetry. These recommendations may be based on similarity scoring or machine learning methods such as Bayesian classifiers, cluster analysis, etc.

Any new artifacts in the external intelligence feed from external cybersecurity threat intelligence providers 145 that match known threat actor campaigns and/or new artifacts recommended for further inspection are alerted to the user (step 306), placed in a queue for later triage (step 307) and stored in the database 326 for potential new taskable artifacts (step 307). At step 308, an analyst, or an automated computer code, vets the new artifacts stored in database 326. At step 309, any new artifacts determined to identify malicious observables are tasked and stored in the key-value database 324 for storing tasked artifacts. As new artifacts are tasked, they are used to discover new IoCs, establish linkages between pairs of related IoCs, and in cluster analysis to associate groups of IoCs with specific threat actors or campaigns. New IoCs are identified via methods such as similarity scoring, clustering, hashing, etc., as well as via external pivots on artifacts. Those new IoCs themselves, in turn, have associated artifacts that can be tasked. This iterative process creates a feedback loop which enables enumeration of threats starting from telemetry of observed malicious observables.

At step 310, a threat intel analyst may review threat intelligence from external threat intelligence providers and/or public reference sources for reasons unrelated to a new domain being observed by the enterprise telemetry 315, and identify new IoCs and/or artifacts which can be stored in graph database 322.

Utilizing external threat intelligence feeds and public reference sources in this way allows for the discovery of new IoCs even if those IoCs have not yet been observed yet in enterprise telemetry 315. These newly discovered IoCs are automatically tasked in an on-premises IoC Monitoring System 345 so that if those IoCs later appear in enterprise telemetry an alert will be generated.

A graph database is a database that uses graph structures for semantic queries with nodes, relationships and properties to represent and store data.

Figure 4:
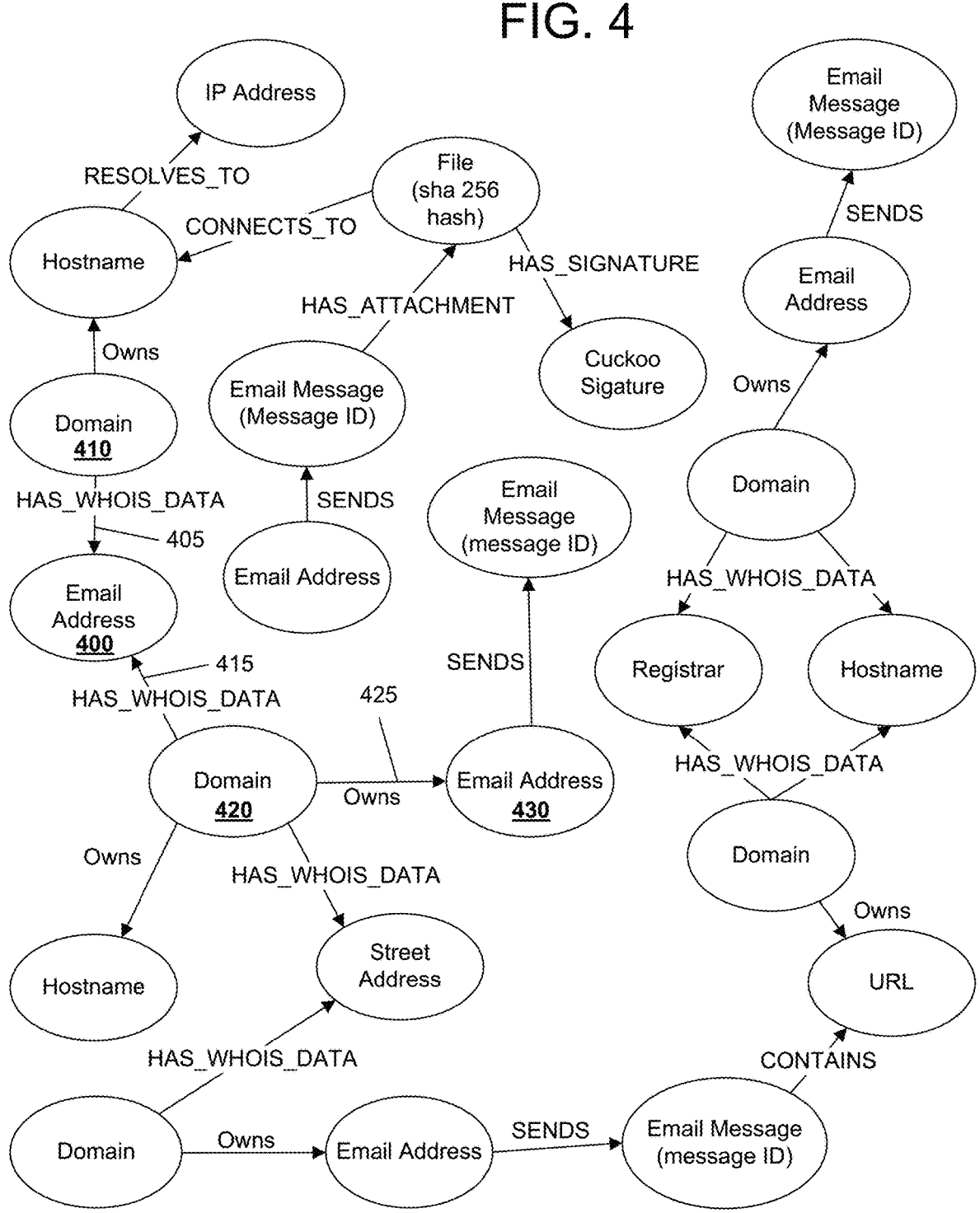
FIG. 4 illustrates, in simplified form, an example part of a unified data model in a graph database that incorporates both internal observations and externally sourced data in accordance with the teachings herein.

FIG. 4 illustrates, in simplified form, an example part of the unified data model in graph database 322 that incorporates both internal observations and externally sourced artifact data in accordance with the teachings herein. By way of example, an email address received for the first time by the organization is represented by node 400 which, in turn, is related to a domain represented node 410 by Whois data 405 and to a domain represented by node 420 by Whois data 415. The domain represented by node 420 is related to an email address represented by node 430 by ownership data 425. In this manner, graph database 322 assists in identifying unique campaign pivot points. An observable has related artifacts which in turn relate to other observables. A campaign pivot enumerates observables using lookups against campaign artifacts. Referring to FIG. 3 at step 311, periodically tasked artifacts are retrieved from key-value database 324 and input to a Campaign External Pivot Engine 355 to identify unique campaign pivot points. At step 312, the identified campaign pivot points are sent to external domain data sources 330, such as external cybersecurity threat intelligence providers 245 and/or public reference sources for additional information/context about the campaign pivot points. Any such additional information/context about the campaign pivot point is sent to the organization as part of step 303.

Figure 5:
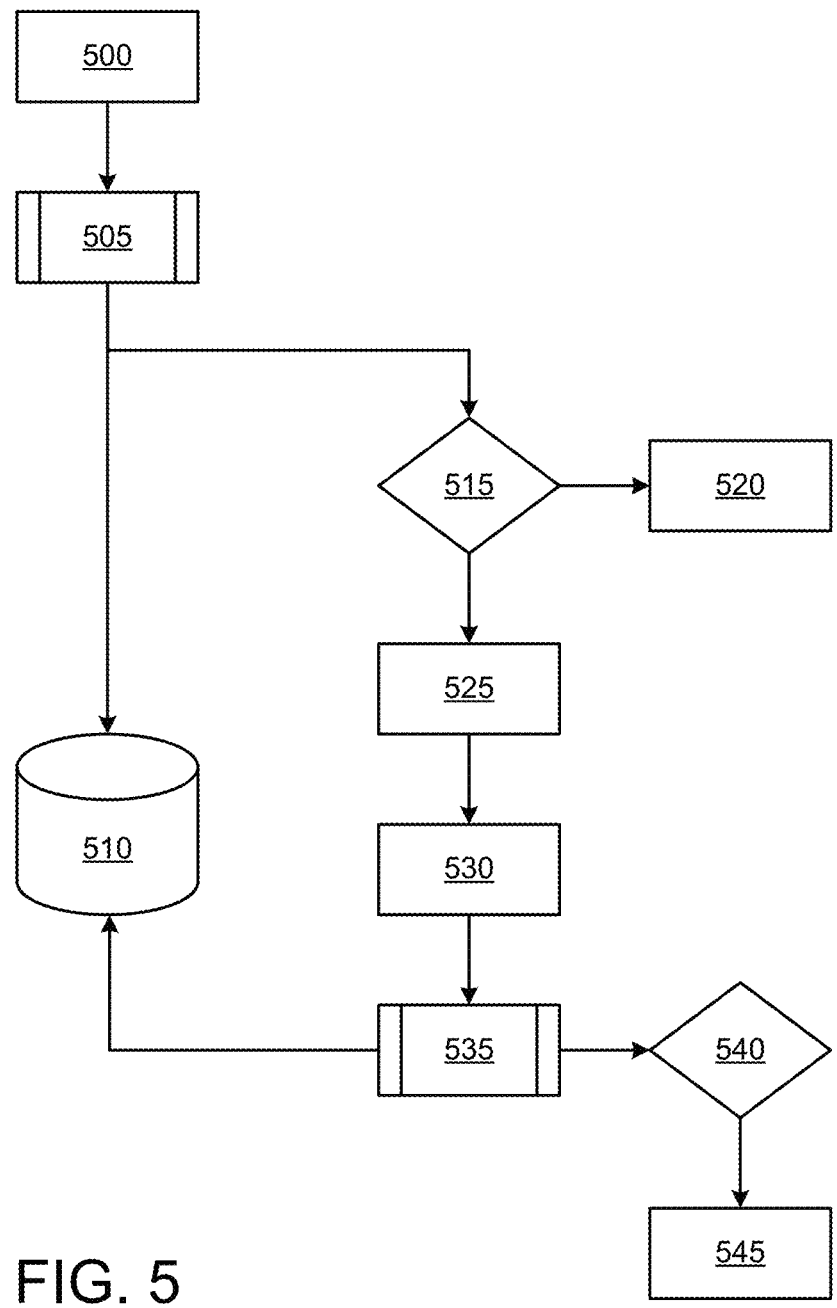
FIG. 5 illustrates, in simplified flowchart form, a method of triaging an artifact in accordance with the teachings herein.

FIG. 5 illustrates, in simplified flowchart form, a method of triaging an artifact in accordance with the teachings herein. First, identification of true positive network threats triggers on-demand external cybersecurity threat intelligence providers 245 and/or public reference sources to be queried for enriching information and artifacts contained within the true positive network threats. Original identification of true positive threats may have been made via file-based or network-based analytics, spam monitoring, custom analytics, etc. The external intelligence feeds sent to the organization by the external cybersecurity threat intelligence providers 245 and/or public reference sources in response to the organization's queries may include artifacts such as, but not limited to, email addresses, physical addresses, contact names, organization names, transport layer security ("TLS") hashes, ISP information, and domain registrar information (Step 500)

Second, a list of the received artifacts is assembled. Derived artifacts, such as hashes of enriching information, fuzzy hashing, locality-sensitive hashing, etc., may be calculated (Step 505).

Third, the artifacts in the external intelligence feed from external cybersecurity threat intelligence providers 245 and derived artifacts are stored in the graph database 322 (Step 510). Simultaneously, the artifacts are assessed to determine if it is a new artifact (Step 515). If it is not a new artifact, the graph database 322 is updated and the triage process is concluded (Step 520). If it is a new artifact, the graph database 322 is updated and the new artifact is placed in the queue for evaluation (Step 525).

Next, a campaign pivot analysis is performed on the new artifact (Step 530). A campaign pivot enumerates observables using lookups against campaign artifacts. A list of unseen and previously seen observables is assembled (Step 535) and stored in the graph database 322. The list of unseen and previously seen observables is assessed by an analyst for campaign artifacts (Step 540) and any identified campaign artifact is added to the Campaign Artifact List (Step 545).

A key feature of the above-described implementations is the passive nature of the caching layer (campaign database 320). Data, which comprises IoCs and artifacts, accumulates in the campaign database 320 as part of routine daily operations including the feedback loop described above. This data is used by threat intelligence analysts and automated processes to conduct trend analysis, cluster threats to the organization, and generate threat intelligence reporting. Keeping internal enterprise data and external threat intelligence data within the same campaign database 320 in a unified data model allows for the discovery of new IoCs and clustering that would not have been possible if these two datasets were treated independently.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. They are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. A system for detecting cyberattacks using enterprise-sourced internal threat intelligence and externally-sourced threat intelligence, comprising:
   (i) enterprise telemetry configured to monitor and analyze messages received or sent over the Internet and to transmit data regarding the messages;
   (ii) a summarization module configured to receive data transmitted by the enterprise telemetry,
      summarize a potential indicator of compromise pertaining to the messages monitored and analyzed by the enterprise telemetry, and
      transmit summarization data about the potential indicator of compromise;
   (iii) a campaign engine configured to
      monitor and discover new indicators of compromise using the enterprise-sourced summarization data that is received from the summarization module and externally-sourced threat intelligence, and identify new artifacts in an external intelligence feed from external threat intelligence providers that match known threat actor campaigns, and transit the new artifacts;
(iv) an internal threat intelligence module configured to receive summarization data from the summarization module, store that summarization data, and transmit summarization data to the campaign engine,
receive data regarding known business email compromise ("BEC") attack domains, store that data regarding known BEC domains, and transmit data regarding known BEC domains to the campaign engine, and
receive the new artifacts from the campaign engine, and store the new artifacts; and
(v) an external threat intelligence module configured to interact with external threat intelligence providers,
store artifacts returned by the external threat intelligence provider,
transmit the artifacts returned by the external threat intelligence provider to the campaign engine, and
perform external pivots on tasked artifacts to discover new (previously unseen) potential indicators of compromise ("IoCs"), which are transmitted to the campaign engine and then tasked in an IoC monitoring system;
wherein the enterprise telemetry comprises
one or more network sensors configured to transmit data to one or more SMTP sensors,
an email gateway configured to analyze incoming email messages for threats to determine whether to block or allow each email message and to emit email logs, and
a proxy server configured to provide a gateway between enterprise users and the internet, and to emit proxy logs of enterprise user activity or connection data; and
wherein the summarization module comprises
a SMTP/Proxy/File summarization module configured to receive data transmitted by the one or more SMTP sensors, the proxy server, and a file analysis subsystem, to summarize a potential indicator of compromise pertaining to the messages monitored and analyzed by the one or more SMTP sensors and the proxy server, to issue a typosquat alert if it identifies a malicious domain registered by a typosquatter, and to transmit summarization data about the potential indicator of comprise, and
an Email Log summarization module configured to receive data transmitted by the email gateway, to summarize a potential indicator of compromise pertaining to the messages monitored and analyzed by the email gateway, and to transmit summarization data about the potential indicator of compromise.

2. The system of claim 1, wherein the campaign engine is further configured to issue a campaign alert when new artifacts observed by the enterprise telemetry are determined to share similarity with known spear phishing and/or business email compromise ("BEC") attack domains.

3. The system of claim 1, wherein the internal threat intelligence module comprises:
an Observation database configured to store data regarding observed indicators of compromise and artifacts received from the summarization module;
a Known BEC Domains database configured to store data regarding known BEC domains; and
a Potential BEC Domains database configured to store any new artifacts and domains in the external intelligence feed from external threat intelligence providers that match known threat actor campaigns received from the campaign engine.

4. The system of claim 3, wherein new artifacts stored in the Potential BEC Domains database are useable by an analyst to identify new indicators of compromise, establish linkages between pairs of related indicators of compromise, and in cluster analysis to associate groups of indicators of compromise with specific threat actors or campaigns.

5. The system of claim 3, wherein the Observation database is a key-value store.

6. The system of claim 3, wherein the external threat intelligence module comprises:
an external domain lookup component configured to interact with one or more external threat intelligence providers and receive Whois data, DNS profile data, or other enriching information,
an external lookup cache configured to store data regarding domain artifacts transmitted by the one or more threat intelligence providers in response to a request by the external domain lookup component, and
a graph database configured to store data regarding domain artifacts.

7. The system of claim 6, wherein the external lookup cache is a key-value store.

8. The system of claim 7, wherein the graph database is configured to facilitate a campaign pivot analysis on a new artifact in the external intelligence feed from the external intelligence threat provider using the data stored in the graph database.

9. A computer-implemented method for detecting cyber-attacks using enterprise-sourced internal threat intelligence and externally-sourced threat intelligence, comprising:
monitoring and analyzing messages received or sent over the Internet by:
transmitting data from one or more network sensors to one or more SMTP sensors,
analyzing incoming messages to determine whether to block or allow each message and to emit message logs, and
emitting logs of user activity or connection data;
extracting observations from the incoming messages and summarizing a potential indicator of compromise, including:
issuing a typosquat alert upon identifying a malicious r domain registered by a typosquatter, and
transmitting summarization data about the potential indicator of compromise;
storing the observation summarization data in an Observation database;
comparing the stored observation summarization data with indicators of compromise and artifacts stored in a Known BEC Domains database and a Potential BEC Domains database;
querying, over the Internet, an external threat intelligence provider, upon determining that an external lookup cache does not contain artifacts for the observation, for enriching information and artifacts contained within the observation, receiving over the Internet enriching information and artifacts from the external threat intelligence provider, and storing the received enriching information and artifacts in the external lookup cache and a graph database;
comparing the artifacts in the external intelligence feed from the external threat intelligence provider against artifacts stored in the Known BEC Domains database, and issuing a campaign alert if any of the artifacts in the external intelligence feed from the external threat intelligence provider for the observation correlate with any of the artifacts stored in the Known BEC Domain database; and storing in the Potential BEC Domains database any new artifacts in the external intelligence feed from external threat intelligence providers that match known threat actor campaigns for later use by an analyst to identify new indicators of compromise, establish linkages between pairs of related indicators of compromise, and in cluster analysis to associate groups of indicators of compromise with specific threat actors or campaigns.

10. The method of claim 9, further comprising performing a campaign pivot analysis on a new artifact in the external intelligence feed from the external intelligence threat provider using the data stored in the graph database.

11. A method for triaging an artifact, comprising:
identifying a true positive network threat received over the Internet by analyzing messages received or sent over the Internet, including
transmitting data from one or more network sensors to one or more SMTP sensors,
analyzing incoming email messages to determine whether to block or allow each email message and to emit email logs, and
emitting logs of user activity or connection data;
querying over the Internet an external threat intelligence provider for enriching information and artifacts contained within the true positive network threat;
receiving over the Internet enriching information and artifacts from the external threat intelligence provider regarding the true positive network threat;
deriving additional artifacts from the enriching information received from the external threat intelligence provider;
storing received artifacts that were received from the external threat intelligence provider and derived artifacts that were derived from the enriching information in a graph database; and
determining if any of the received artifacts and the derived artifact is a new artifact, and after identifying a new artifact, performing a campaign pivot analysis on the new artifact.

12. The method of claim 11, further comprising:
assembling a list of unseen and previously seen observables, while performing the campaign pivot analysis, and storing the list of unseen and previously seen observables in the graph database; and
assessing the list of unseen and previously seen observables for campaign artifacts.

13. A system for detecting cyberattacks using enterprise-sourced internal threat intelligence and externally-sourced threat intelligence, comprising:
enterprise telemetry comprising
one or more network sensors,
an email gateway, and
a proxy server;
a summarization module comprising
a SMTP/Proxy/File summarization module, and
an Email Log summarization module;
a campaign engine;
an internal threat intelligence module; and
an external threat intelligence module;
wherein (i) the enterprise telemetry is communicatively coupled to the summarization module, (ii) the summarization module is communicatively coupled to the campaign engine, the internal threat intelligence module, and the external threat intelligence module, and (iii) the campaign engine is communicatively coupled to the internal threat intelligence module and to the external threat intelligence module; and
wherein, in operation, the system
monitors and analyzes messages that are received or sent over the Internet to generate data regarding those messages,
summarizes any potential indicators of compromise derived from the analyzed messages,
transmits summarization data about those indicators,
monitors and discovers new indicators of compromise by correlating the summarization data with externally sourced threat intelligence,
identifies new artifacts in external intelligence feeds that match known threat actor campaigns and transmits those new artifacts,
stores the summarization data,
receives data regarding known business email compromise ("BEC") attack domains,
stores that data regarding BEC domains,
receives and stores the new artifacts;
interacts with external threat intelligence providers,
stores artifacts returned by those providers,
transmits the returned artifacts, and
performs external pivots on tasked artifacts to discover new potential indicators of compromise ("IoCs"), which are transmitted to an IoC monitoring system.

* * * * *